Aug. 18, 1964    B. S. PALMER    3,144,888
TOOL FOR APPLYING BINDING STRAPPING, WIRE
AND THE LIKE ABOUT ARTICLES
Filed July 22, 1960    13 Sheets-Sheet 1

INVENTOR
Basil S. Palmer
BY
Kenyon, Palmer & Stewart
ATTORNEY

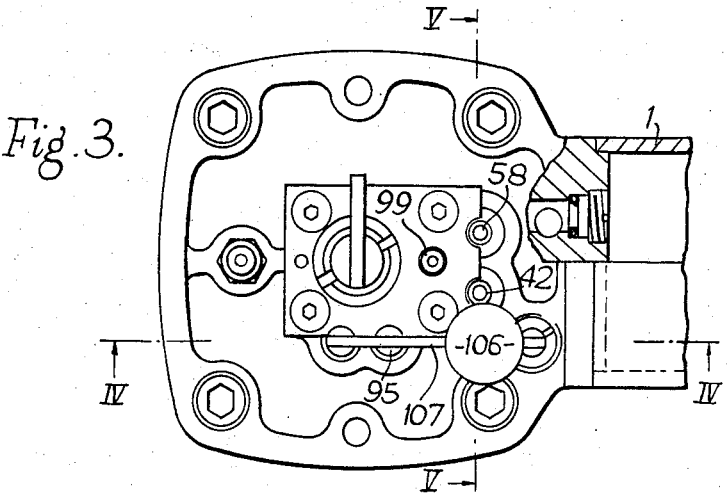
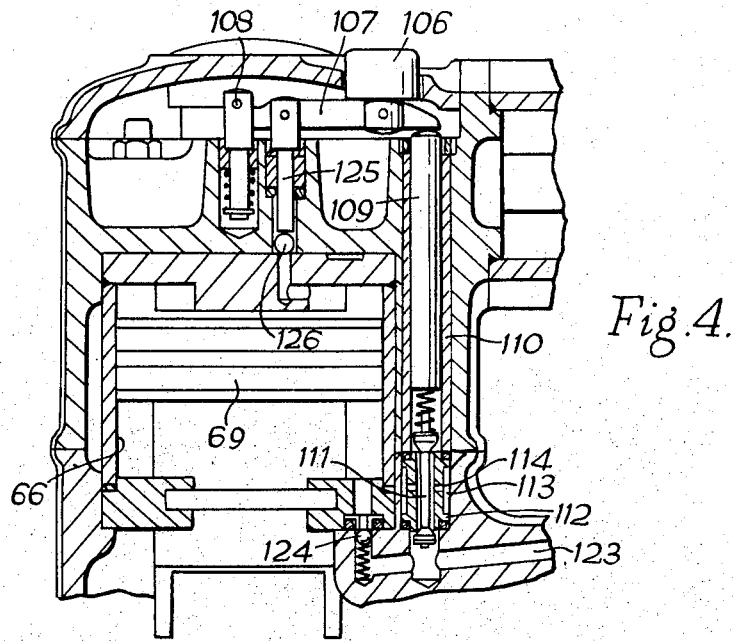

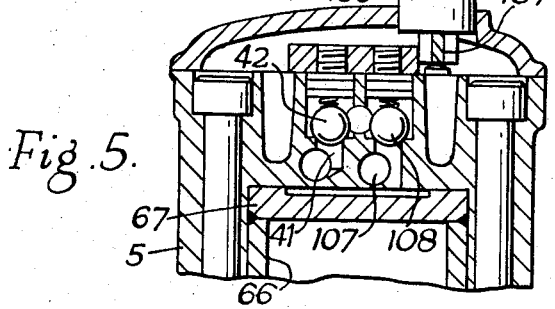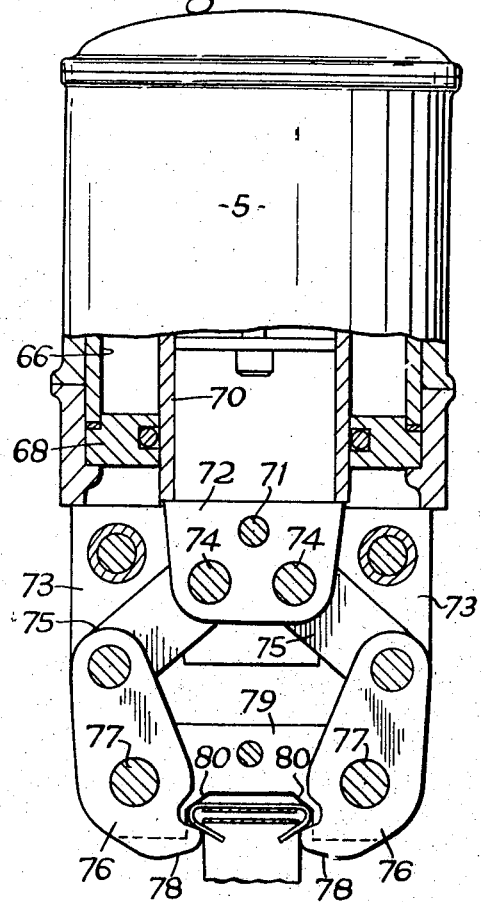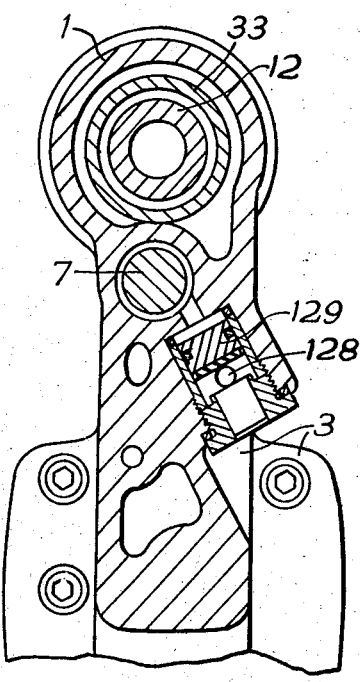

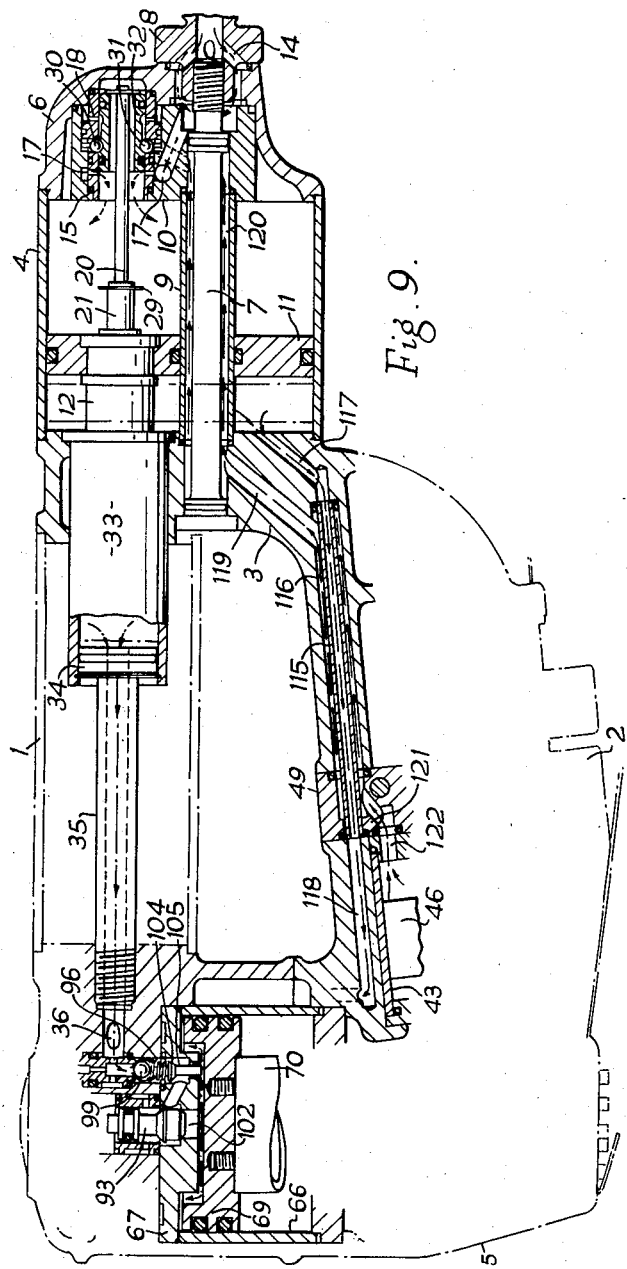

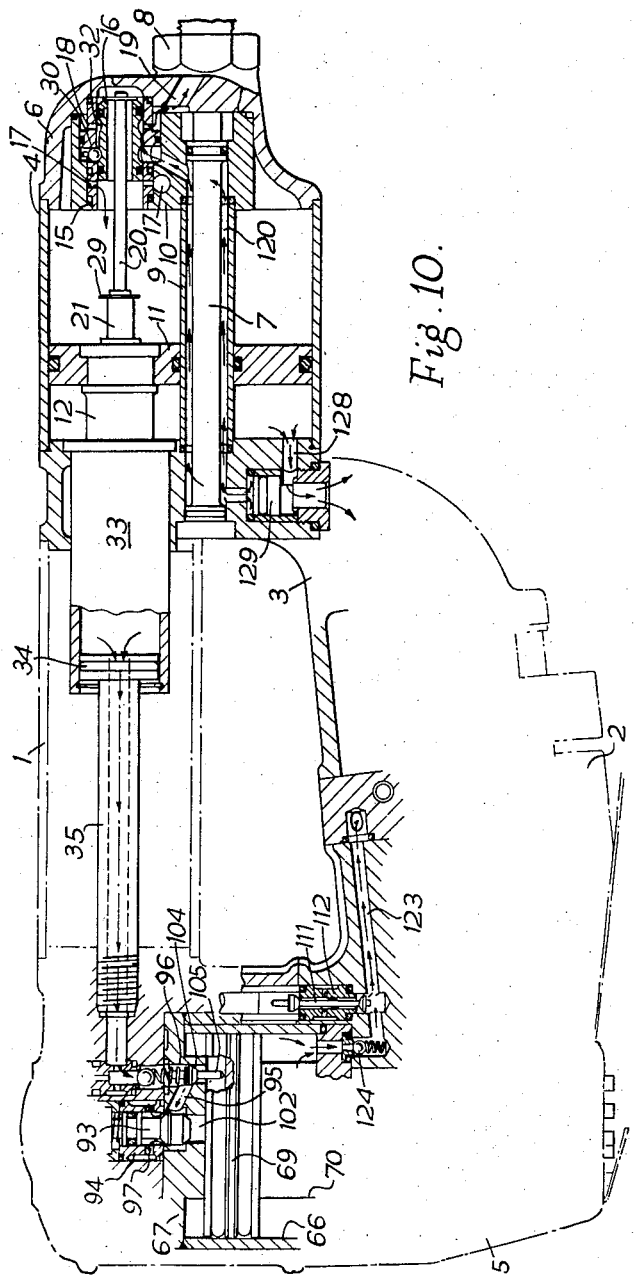

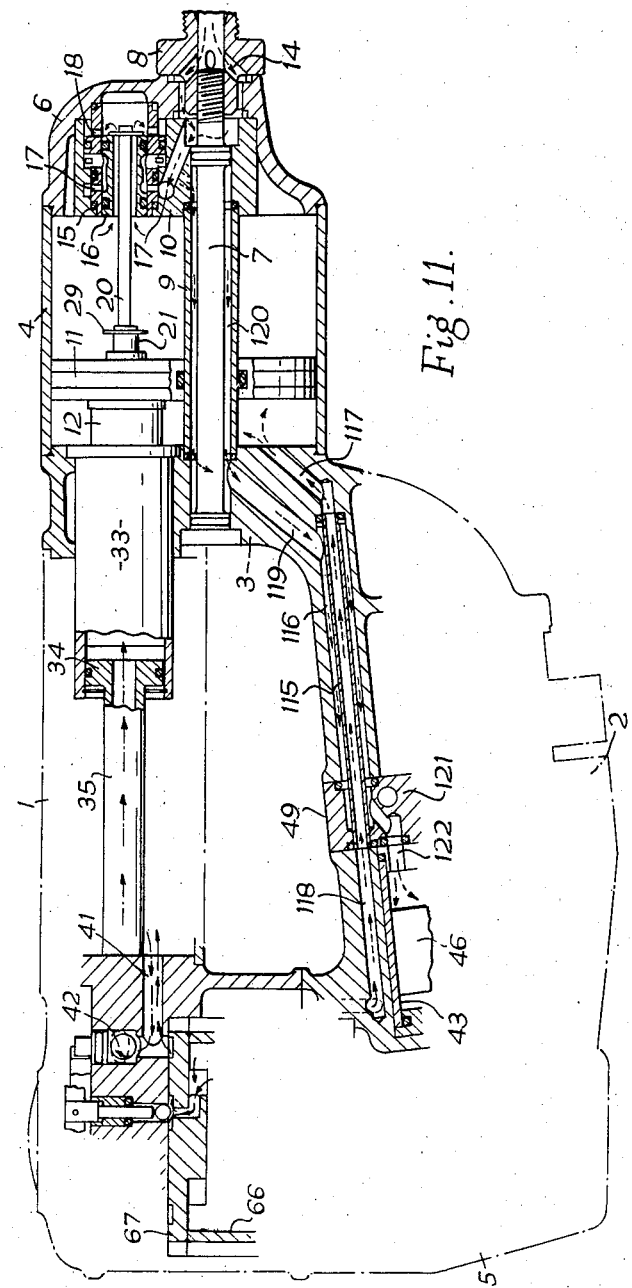

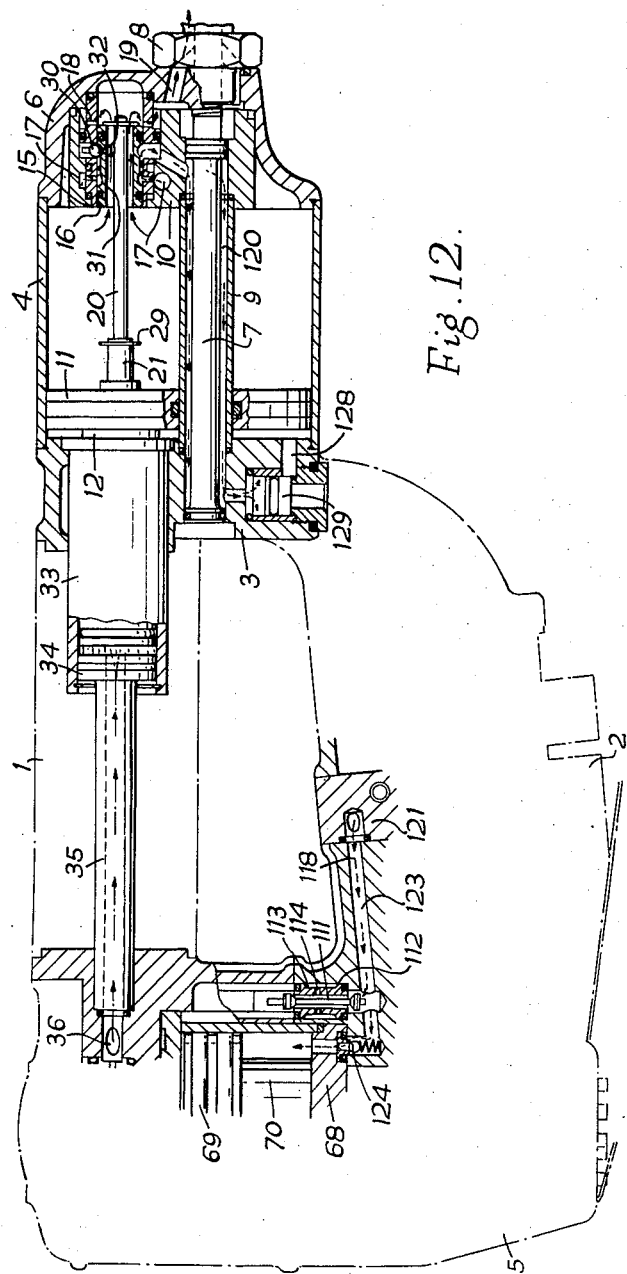

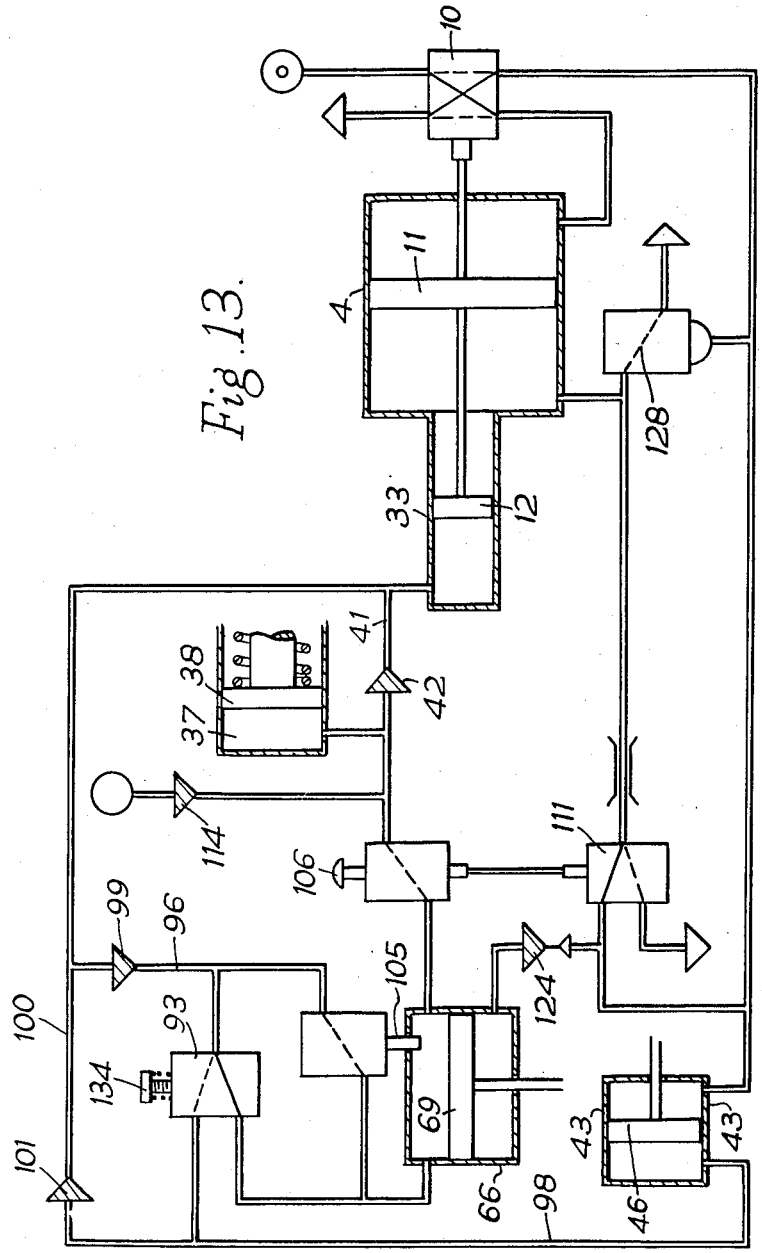

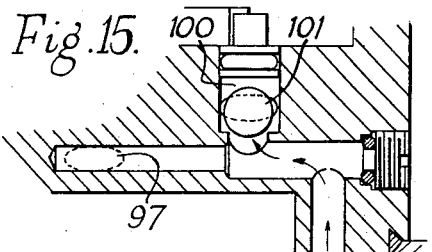
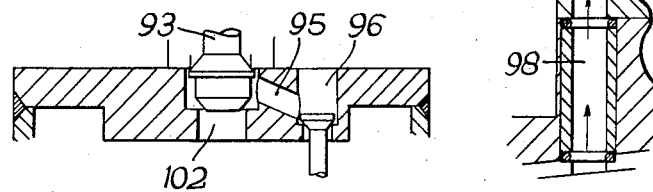
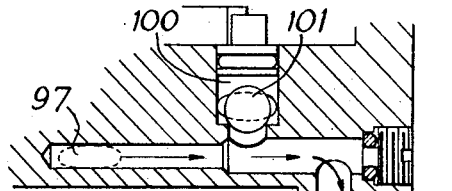

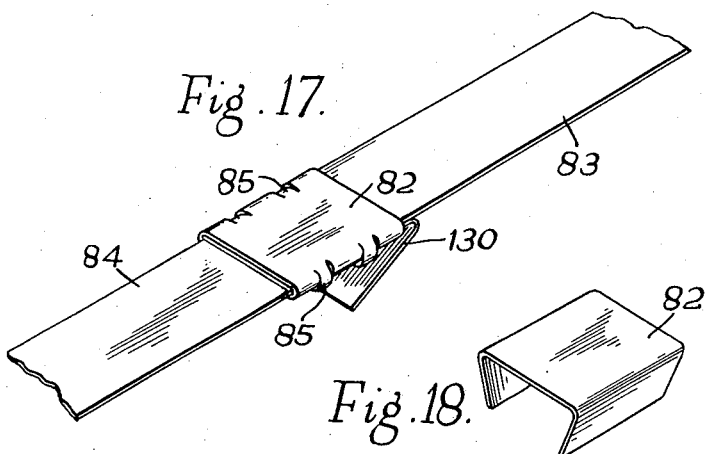
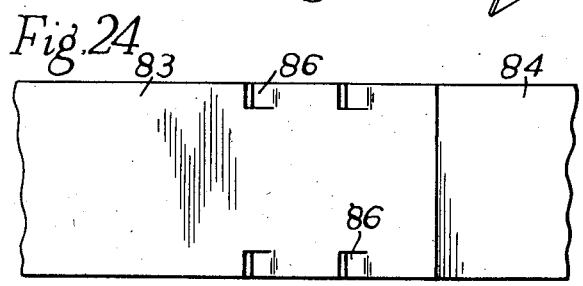
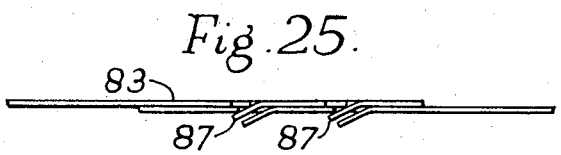
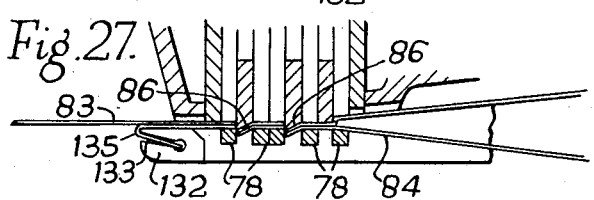

United States Patent Office 3,144,888
Patented Aug. 18, 1964

3,144,888
TOOL FOR APPLYING BINDING STRAPPING,
WIRE AND THE LIKE ABOUT ARTICLES
Basil S. Palmer, Fareham, England, assignor to Packers Supply Company Limited, Surrey, England, a British company
Filed July 22, 1960, Ser. No. 44,780
Claims priority, application Great Britain Aug. 14, 1959
21 Claims. (Cl. 140—93.2)

The present invention relates to improvements in and relating to tools for use in binding boxes, cases, bales and other articles with tensioned metal strapping, wire or the like, hereinafter referred to as strapping.

The binding of articles with tensioned strapping has hitherto usually been carried out with the aid of hand operated tools embodying grippers, friction rollers or the like operated by a rotary or rocking hand lever provided on the tool to draw strapping, one end of which is suitably anchored, through or past the tool to contract the loop of strapping around the article and thus tension the strapping.

Tools are also known embodying motor-driven means for moving strapping through the tool to tension it.

The loop of strapping having been tensioned about the article the ends of the tensioned loop are joined together either by the deformation of a sealing sleeve usually termed a seal, applied about overlapping parts of the tensioned strapping in conjunction with deformation of the parts of the strapping enveloped by the seal, or alternatively by deformation of overlapping parts of the tensioned strapping alone in such a manner as to effect the jointing without the aid of a seal.

The jointing operation has been a separately executed hand operation by the operator, carried out with the aid of a tool usually separate from the tensioning tool but sometimes embodied in the tensioning tool and provided with separately operated hand levers. Severing of the tensioned and jointed loop from the remainder of the strapping has been effected sometimes as a further separate hand operation after jointing and sometimes by a continuation of the hand-made movements involved in producing the joint.

It is a primary object of the invention to provide a power-operated tool whereby the operation of tensioning the looped strapping and thereafter jointing the tensioned strapping may be carried out in automatic sequence.

It is a further object of the invention to provide a power-operated tool whereby the operations of tensioning and jointing the strapping and severance of the tensioned and jointed loop from the remainder of the strapping may be carried out in automatic sequence.

The improved tool for use in binding articles with strapping according to the invention comprises a supporting body, first means carried by and movable with respect to said body and for engagement with strapping to move it relative to said body in the general direction lengthwise of the part of the strapping engaged thereby to effect tensioning, further means carried by and movable with respect to said body and for direct or indirect engagement with overlapping parts of the strapping to deform and join said overlapping parts, power-operated means carried by said support for moving said first and said further means, and a control responsive to achievement of a predetermined tension in the strapping to interrupt operation of said first or tensioning means by said power-operated means and initiate operation of said further or jointing means by said power-operated means.

The said control is made adjustable so that the degree of tension to be applied to the looped strapping preceding the changeover to jointing may be varied according to the nature of the article being bound or the form and dimensions of the strapping being used.

The improved tool may also include means for severing automatically the tensioned and jointed loop of strapping from the remainder of the strapping following completion of the jointing operation.

Conveniently, the improved tool may make use of a pneumatic-hydraulic motor suitable to be powered from a compressed air line, such an arrangement having the advantage that the tool can then be largely self-lubricating and it is merely necessary to connect the tool with any existing pressure air line capable of supplying a given minimum pressure, no pressure regulator being required.

The invention is illustrated by way of example in the accompanying drawings in an embodiment utilising a pneumatic-hydraulic motor, and in the drawings FIG. 1 is a general perspective view of a complete tool embodying the invention.

FIG. 3 is a plan view of the head of the tool of FIG. 2 shown with the cover plate removed.

FIG. 4 is a view in sectional side elevation of the upper part of the head of the tool of FIG. 2 and taken on the line IV—IV of FIG. 3.

FIG. 5 is a view in sectional end elevation of the upper part of the head of the tool of FIG. 2 and taken on the line V—V of FIG. 3.

FIG. 6 is a view in end elevation of the head of the tool, shown partly in section on the line VI—VI of FIG. 2.

FIG. 7 is an end sectional elevation on the line VII—VII of FIG. 2.

FIGS. 9, 10, 11 and 12 are diagrammatic sectional side elevational views illustrating fluid flow paths through the tool.

FIG. 13 is a simplified diagrammatic flow diagram.

FIGS. 14, 15 and 16 are detail views showing certain valves.

FIG. 17 is a perspective view of one from of joint for the strapping utilising a seal.

FIG. 18 is a perspective view of a seal as used for making the joint of FIG. 17.

FIGS. 24 and 25 are views in plan and elevation respectively of a seal-less joint and FIGS. 26 and 27 illustrate a modification of parts of the head of the tool of FIGS. 1 to 16 to enable the seal-less joint of FIGS. 24 and 25 to be produced with the tool.

Figure 1:
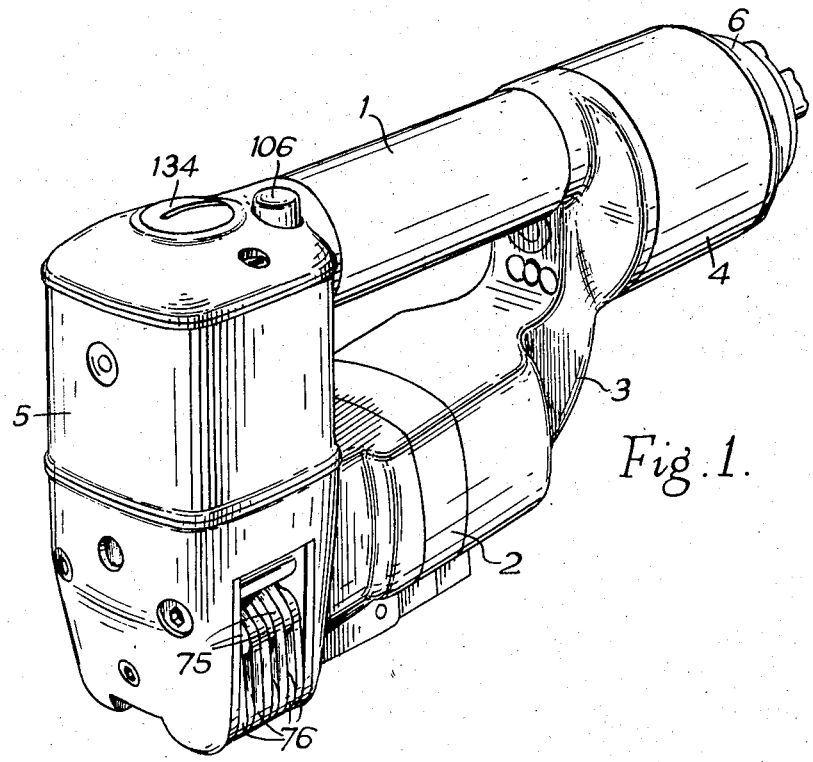
Figure 8:
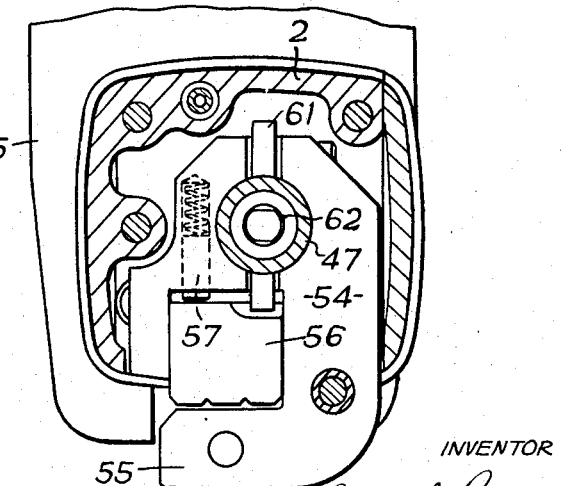
FIG. 8 is an end sectional elevation on the line VIII—VIII of FIG. 2.

The tool as illustrated in the drawings comprises a supporting body consisting of two spaced and approximately parallel hollow cylindrical parts 1 and 2, an upper and a lower, the upper cylindrical part 1 being of a size to form a hand grip (see FIG. 1).

The two cylindrical parts 1 and 2 are connected at what will be termed the rear end by an integral bridge piece 3 to the rear of which is fixed a closed cylindrical extension 4 of a diameter greater than that of the cylindrical part 1 and in a position such that the axis of the cylindrical part 1 passes through the extension 4 and is parallel to the axis thereof.

The cylindrical parts 1 and 2 at the forward end of the tool are joined by a hollow portion 5 which will be termed the head of the tool and the head or parts of the head of the tool are detachable to permit substitution or interchange of parts according to the nature and size of the strapping to be dealt with.

The cylindrical rearward extension 4 is closed at its outer end by an end cap 6 and the cylindrical extension 4 and the end cap 6 are fixed to the supporting body by means of a tie bolt 7 engaged at one end in the bridge piece 3, and an external union nut 8, the tie bolt 7 being surrounded with clearance by a spacing sleeve 9 extending between the bridge piece 3 and a valve structure 10 located inside the end cap 6.

The closed cylindrical extension 4 constitutes the air cylinder of a motor and it contains a reciprocating piston 11.

The piston 11 is guided in its movements by sliding upon the spacing sleeve 9 which is offset from but parallel to the axis of the air cylinder 4.

At the forward side of the piston 11 is affixed an aixally extending hollow plunger member 12 closed at its forward end, this plunger member forming a part of an hydraulic motor yet to be described.

Figure 2:
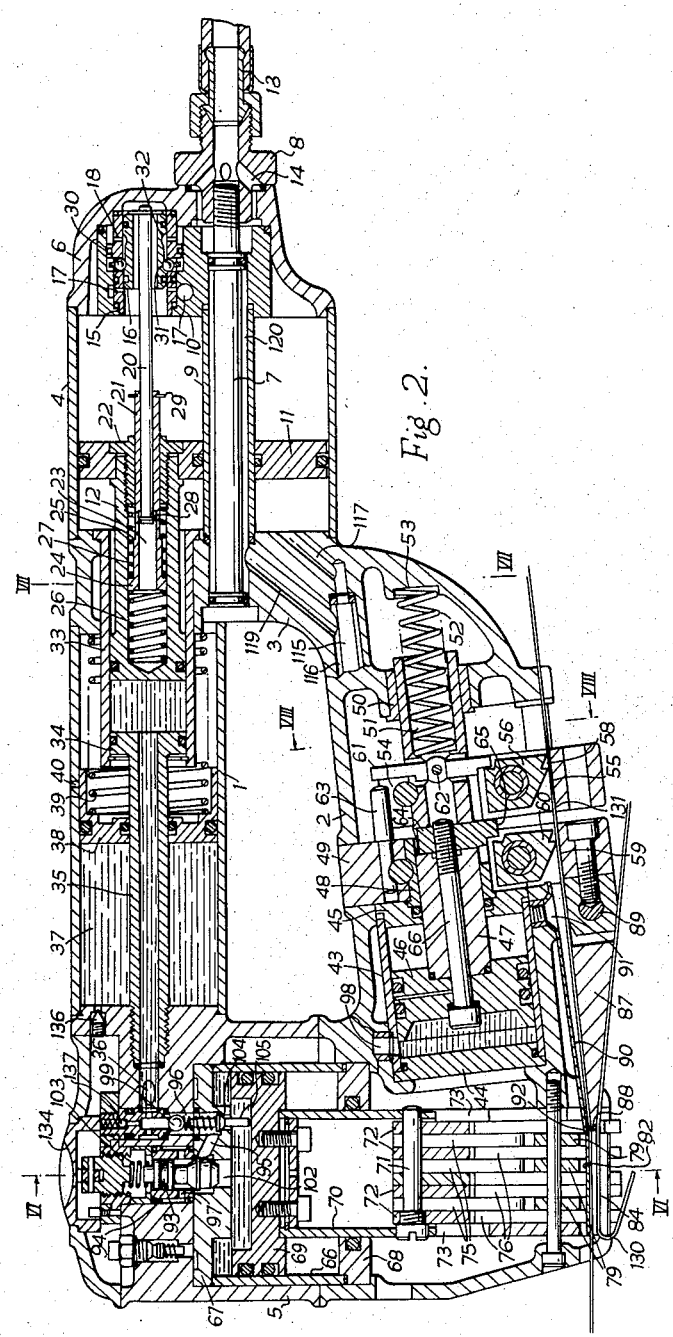
FIG. 2 is a view in sectional side elevation and on a larger scale, taken on the longitudinal central plane of the complete tool of FIG. 1.

The union nut 8 outside the rear end cap 6 of the air cylinder 4 is of a form to receive a compressed air line 13 in its outer end and is formed with air ports 14 leading compressed air through the end cap 6 as shown in FIGS. 2, 9 and 11.

The valve structure 10 referred to above as being located inside the end cap 6 is a change-over valve and includes a fixed body portion 15 and a reciprocating member 16.

A port 17 in the fixed body portion 15 of the valve structure 10 is in communication with a compressed air line 13 as shown in FIG. 11 and a port 18 in the fixed body portion 15 of the valve structure 10 is in communication with atmosphere by way of a separate exhaust passage 19 (FIGS. 10 and 12) leading through the end cap 6. The reciprocating member 16 is movable between two end positions to transfer between the two ports 17 and 18.

The movements of the reciprocating member 16 of the changeover valve 10 are effected by means of a lost-motion connection between the member 16 and the above described hollow plunger member 12.

For this purpose a rod 20 (FIG. 2) connected with the reciprocating member 16 extends through a slider 21 extending into the hollow plunger member 12 and itself capable of sliding in a bored spigot 22 fixing the air piston 11 to the hollow plunger 12. The slider 21 is provided with a stopped axial bore at the end within plunger 8 as shown at 23 and is also provided at its extremity within the plunger 8 with a circumferential flange 24 and at a point spaced from said flange 24 with an external shoulder 25 the latter forming a stop for co-operation with the end of the spigot 22.

Opposite sides of the flange 24 are engaged by compression springs 26 and 27, one abutting the closed end of the hollow plunger 12 and the other abutting the end of the spigot 22.

A fixed collar 28 is provided on the end of the rod 20 inside the bored end 23 of the slider 21 and a similar fixed collar 29 is provided on the end of the slider 21 remote from the plunger 12 and outside the spigot 22.

The reciprocating member 16 of the change-over valve 10 is held stationary in each of its two end positions by the engagement of spring-loaded balls 30 carried in the body portion of the changeover valve 10 in either one of two depressions 31 and 32 in the member 16 (FIGS. 2, 9, 10 and 12).

The piston 11 is moved in both directions in the cylinder 4 by compressed air pressure and the side of the piston 11 to which compressed air is applied and therefore the direction of movement of the piston 11 is dependent upon which of the two end positions is occupied by the reciprocating member 16 of the change-over valve 10, and the change-over or transfer movement of the member 16 is effected automatically as the piston 11 approaches completion of a stroke in either direction.

With the piston 11 moving in the direction towards the left, as shown in the drawings, in the air cylinder 4, i.e. making a working stroke, the reciprocating member 16 of the change-over valve is in its right-hand end position with reference to the fixed part 15, as shown in FIGS. 2, 9 and 10.

As the pistoin 11 and the attached hollow plunger 12 move towards the left in FIG. 2 the rod 20 remains stationary being held by the retained reciprocating member 16 and the slider 21 may move until the bottom of the bore 23 in the slider meets the stop collar 28 on the end of the rod 20 so that the slider 21 also becomes stationary, and the spring 25 is progressively loaded until the end of the spigot 22 moving with the piston 11 meets the external shoulder 25 on the slider 21.

Thereafter the slider 21 is moved positively by the moving spigot 22 to draw upon the collar 28, the rod 20 and the reciprocating member 16. As soon as the retaining balls 30 are disengaged from the recesses 31 the loaded spring 25 takes over to move the slider 21, the rod 20 and therefore the reciprocating member 16 to its left-hand end position (FIGS. 11 and 12) with snap action and the access of compressed air to the right-hand side of the piston 11 is cut off.

With the piston 11 and the attached hollow plunger 12 moving to the right as shown in the drawings, in the air cylinder 4, i.e. making a return stroke, the reciprocating member 16 of the change-over valve is in its left-hand end position as shown in FIGS. 11 and 12. The rod 20 remains stationary being held by the retained reciprocating member 16, and the slider 21 is moved to the right through the spring 26 until the stop collar 29 makes engagement with the left-hand end of the reciprocating member 16 itself. The piston 11 and plunger 12 continue to move and now relative to the slider 21 until the end of the spigot 22 contacts the collar 29 so that slider 21 and the reciprocating member 16 are moved positively to disengage the balls 30 from the recesses 32.

Meantime spring 26 has been loaded by the relative movement between the plunger 12 and the slider 21 so that with the retaining balls 30 disengaged as described the spring 26 takes over to move the reciprocating member 16 from its left-hand end position to its right-hand end position with snap action and the supply of compressed air to the left-hand side of piston 11 is cut off.

In the upper part of the casing at the forward end of the air cylinder 4 is fixedly mounted a cylinder 33 extending axially into the hand-grip-forming cylindrical part 1 of the casing.

The above described hollow plunger 12 fixed to the air piston 11 is engaged for sliding movement in this cylinder 33 and the plunger 12 and cylinder 33 constitute the hydraulic pump of the motor for operating the tool.

The cylinder 33 at its end remote from the air cylinder 4 is closed by the flanged end 34 of a fixed oil tube 35 leading to an oil port 36 having three outlets within the head 5 of the tool, and a part of the space within the upper cylindrical part 1 of the casing surrounding the fixed tube 35 constitutes an oil reservoir space 37 closed at one end by a piston 38 slidable on the tube 35 and urged by a spring 39 in the direction towards the head 5, the reservoir space 37 being vented to atmosphere by a vent 40 which is uncovered by the piston 38 in one end position of the latter.

A conduit 41 (FIGS. 5, 11 and 13) containing a non-return valve 42 affords communication between the oil reservoir space 37 and the interior of the pump cylinder 33 by way of one of the ports 36 and the tube 35.

In the lower cylindrical part 2 of the casing is mounted the means for tensioning the strapping.

The tensioning means comprises a generally horizontally arranged and fixedly mounted hydraulic cylinder 43 closed at both ends as shown at 44 and 45 (FIG. 2) and containing a movable ram 46 provided with an elongated coaxial extension 47 slidable in a first guide 48 in a fixed insert 49 in the lower cylindrical part 2 of the support structure behind the rear end closure 45 of the hydraulic cylinder 43 and a second guide 50 fixed in a position adjacent the bridge piece 3 of the support structure. The free end of the extension 47 is bored axially as shown at 51 and a compression spring 52 extends between a fixed abutment 53 and the bottom of the bore 51 in extension 47. The arrangement is such that the assembly of ram 46 and extension 47 can be moved in one direction, i.e. to the right in FIG. 2 by introduction of oil under pressure into the cylinder 43 at the left-hand side of the ram 46 or in the other direction by compressed air introduced into the cylinder 43 at the right-hand side of the ram 46, assisted by the spring 52.

On the extension 47 is fixed a carrier 54 (FIGS. 2 and 8) for a strapping-gripping device said carrier including a laterally extending anvil portion 55 projecting at the underside of the lower cylindrical part 2 of the tool.

On the carrier 54 and above the anvil 55 is mounted a pivoted pawl 56 biased by a spring-loaded plunger 57 (FIG. 8) in one direction, clockwise in FIG. 2, and having serrations on its lower side whereby strapping, indicated by 58, may be clamped to the anvil 55 for movement therewith when the ram 46 and carrier 54 are moved in one direction i.e. to the right in FIG. 2, whilst sliding freely over the strapping when the ram and carrier are moved in the other direction.

Forward of the movable carrier 54 is provided a one-way gripping device comprising a body part which in the case shown is formed by the insert 49, in fixed position in the support structure, said body part having a laterally extending anvil-forming portion 59 at its lower side the upper surface of which is in the same plane as the upper surface of the anvil 55 on the carrier 54, and on the body part formed by insert 49 is mounted a spring-loaded pivoted pawl 60 also biased clockwise about a pivot by a spring (not shown) and also having serrations on its under side for clamping engagement with strapping 58 resting upon the anvil 59. The arrangement is such that strapping moved in the tensioning direction by the anvil 55 and pawl 56 on the movable carrier 54, i.e. to the right in FIG. 2, can be drawn freely through the one-way gripping device 59, 60, but when the pulled strapping is released from the grip of the anvil 55 and pawl 56, i.e. upon a return movement of the ram 46 and carrier 54 towards the left in FIG. 2, the released strapping is held by the one-way gripping device 59, 60, against return movement.

In a diametrical hole in the extension 47 movable with the ram 46 is mounted a lever 61 pivoted as shown at 62 (FIGS. 2 and 8) for rocking movement and having a lower end for engagement with a shoulder on the pawl 56 and an upper end for engagement with a fixed abutment 63.

In a further diametrical hole in the ram extension 47 is fixed a pin 64 the lower end 65 of which forms a projecting nose for engagement with a shoulder on the pawl 60 of the one-way gripping device. In the case illustrated the pin 64 also serves as a nut for a bolt 66 connecting the extension 47 to the ram 46.

In FIG. 2 the ram 46 is shown in a position spaced from the forward end 44 of the hydraulic tensioning cylinder 43 and in this position the lever 61 remains disengaged from the fixed abutment member 63 and the nose 65 remains disengaged from the shoulder on the pawl 60 of the one-way gripping device.

When the ram 46 takes a position closer to the forward end 44 the upper end of the lever 61 meets the abutment member 63 so that the lever 61 is rocked into engagement with the shoulder of the pawl 56 to rock the pawl against its spring-loaded plunger 57 and hold its serrated surface away from the anvil 55.

Similarly the nose 65 of the pin 64 meets the shoulder on pawl 60 of the one-way gripping device to rock that pawl and hold its serrated surface away from the anvil 59. The easy insertion of strapping sideways between the pawls 56 and 60 and their respective anvils 55 and 59 is thus made possible.

In the head portion of the tool is mounted jointing means for joining the overlapping ends of a tensioned loop of strapping.

In the case illustrated in FIG. 2 the jointing means comprises a fixed and generally vertically arranged hydraulic cylinder 66 closed at both ends as shown at 67 and 68, and a ram 69 movable in the cylinder 66 and connected with a ram-operated plunger 70 mounted for up and down guided movement in the lower end closure 68 of the cylinder 66.

The plunger 70 carries a transverse pin 71 engaged in holes in a plurality, four in the case shown, of parallel spaced plates 72 capable of up and down sliding movements in a frame structure 73 (FIGS. 2, 19, 20, 21, 22 and 23) mounted in fixed position in the head part 5 of the support structure.

The plates 72 are pivotally connected at 74 with four pairs of symmetrically arranged toggle levers 75, the lower members 76 of which are spaced from and parallel to one another, are movable about parallel fixed pivot pins 77 in the frame structure 73 and are provided with inwardly extending shaped teeth 78 at their lower extremities.

Figure 23:
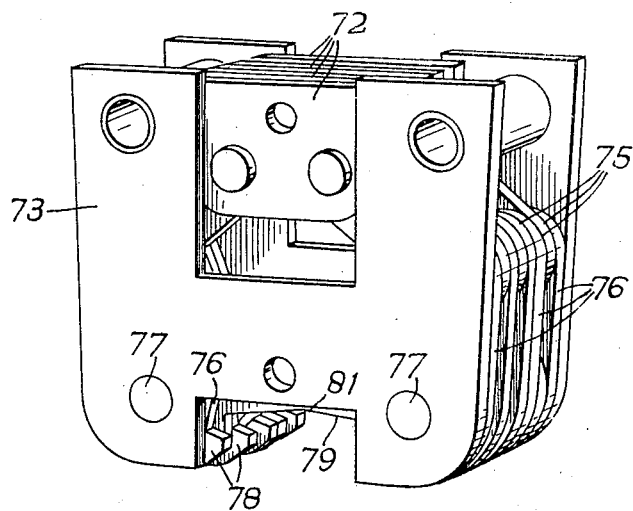
FIG. 23 is a perspective view of the jointing and severing means.

In the spaces between the lower toggle lever members 76 are mounted three fixed bars 79 carried upon the fixed pivot pins 77, said bars being recessed on their lower edges and the two bars 79 nearer the forward end of the tool being shaped at the ends of the recesses to present downwardly facing end projections 80 (FIGS. 6, 19, 20) whilst the bottom of the recess in the rearmost bar 79 is of shallow V formation as shown at 81 in FIG. 23.

The ram 69 and plunger 70 are moved downwards to make a joint, by the introduction of pressure oil into the cylinder 66 above the ram and the upward return stroke is made by the introduction of compressed air into the cylinder 66 beneath the ram 69.

The tool embodying jointing means as described above is used to produce joints with the aid of a seal such as is shown at 82 in FIG. 18 applied about the overlapping ends 83 and 84 of the strapping (FIG. 17).

Figure 19:
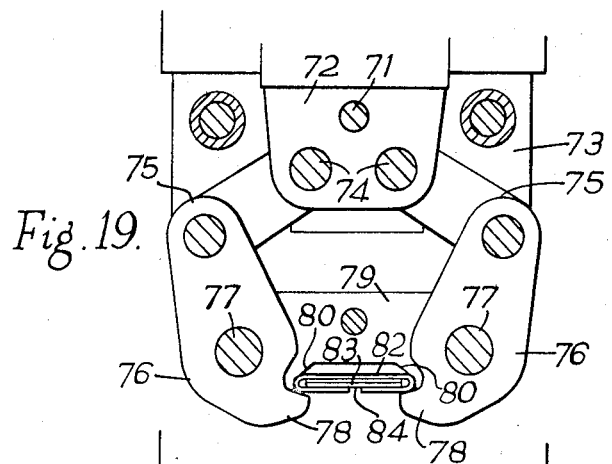
FIGS. 19 and 20 are fragmentary views showing different positions of parts of the jointing means for forming a joint as shown in FIG. 17.

In this case, with the seal 82 applied about the overlapping parts 83, 84 of the strapping and the tool applied over the seal 82 the latter engages in the recesses at the under sides of the bars 79 with the side edges of the seal in contact with the projections 80 at the ends of the recesses of the two bars 79 nearest the forward end of the tool, as shown in FIG. 19 whilst the tensioning operation is being carried out.

Figure 20:
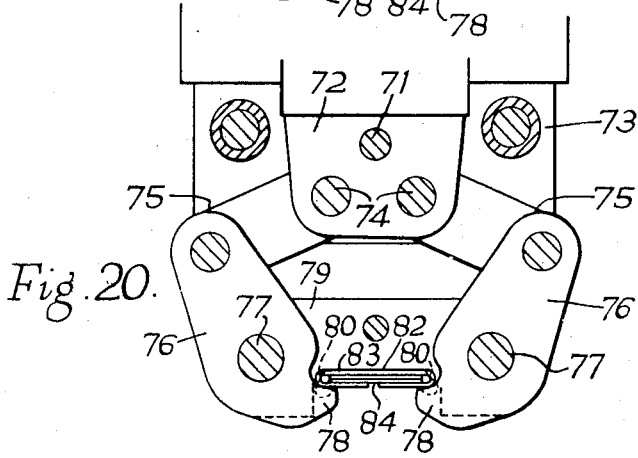
Figure 21:
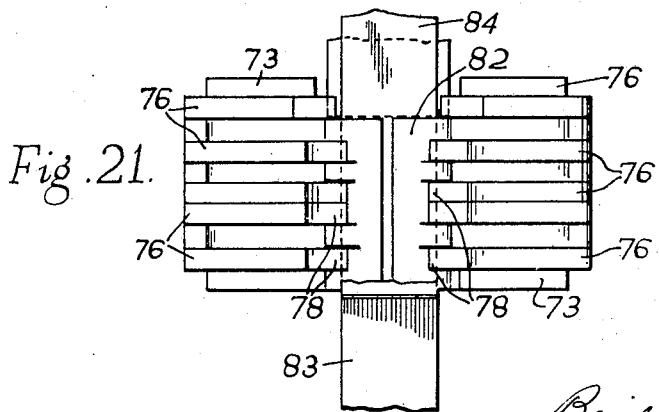
FIG. 21 is an underside plane view of the parts shown in FIGS. 19 and 20.
Figure 22:
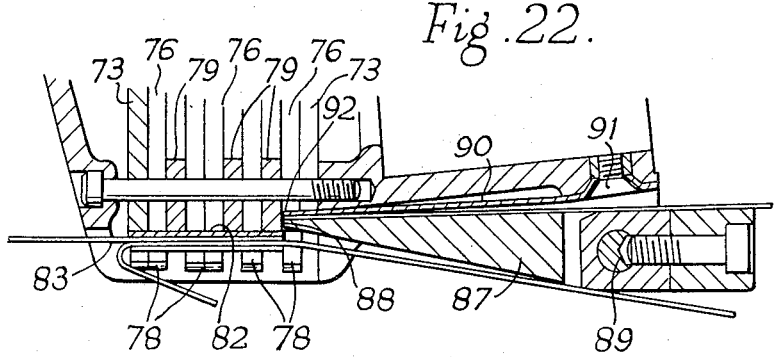
FIG. 22 is a fragmentary view showing the means for severing the strapping.

A downward stroke of the ram 69 and plunger 70 to effect jointing moves the plates 72 downwards in the frame structure 73 from the position of FIG. 19 to that of FIG. 20 so that the lower members 76 of the toggle levers 75 are rocked about their pivots 77 to make precise engagement between the teeth 78 and the seal 82 such as to raise the seal 82 and the enveloped parts 83 and 84 of the strapping in the recesses in the bars 79 and to such an extent that the projections 80 at the ends of the recesses effect deformation or crimping of the edges of the seal as shown at 85 in FIG. 17 as well as of the edges of the enveloped portions of the strapping.

The tool may however also be used to produce joints by direct deformation of the strapping and without the need for a seal, such a seal-less joint and a modified form of jointing means for making it is illustrated in FIGS. 24, 25, 26 and 27.

In this case the two bars 79 nearer the front of the tool are provided on their undersides with inclined projections 86 with cutting edges (FIGS. 26 and 27) such that when the overlapping ends 83 and 84 of the strapping are pressed by the teeth 78 on the lower members 76 of the toggle levers 75 against the bars 79 incisions are made by the inclined projections 86 in the edges of the two layers of strapping and lugs 87 and 88 bent from the strapping to extend below both layers of strapping and such that when the engagement of the teeth 78 is released the tension in the strapping causes retaining engagement to take place between the lugs 87 forming part of the upper layer 83 of strapping with the adjacent edges of the incisions in the lower layer 84 of strapping as shown in FIGS. 24 and 25.

At the underside of the tool is mounted a cutter member in the form of a body 87 of a section tapering downwards to a transverse shearing edge 88 (FIGS. 2 and 22), this cutter member 87 being mounted for limited rocking movement so that the shear edge 88 can move up and down, about a horizontal pivot axis 89.

As the jointing operation is completed by the teeth 78 of the lower members 76 of the toggle levers 75 nearer the front end of the tool the teeth 78 of the rearmost toggle levers engage beneath the side edges of the cutting member 87 to rock said cutting member upwards about its pivot 89 and when a seal 82 is used, cutting of the upper layer 83 of the strapping is effected by shearing against the rear edge of the seal 82, the end of the seal being bolstered by the shallow V-shaped recess 81 of the rear bar 79 (FIG. 23) during the cutting operation by member 87.

In the case of a seal-less joint the cutting operation is effected by the edge of the cutting member 87 in conjunction with an edge of the shallow V-shaped recess 81 in the rear bar 79.

Above the cutting member 87 is mounted a stiff leaf spring 90 anchored at one end to the supporting structure as shown at 91 and its free end 92 being located adjacent the rearmost bar 79, in which position it serves as a locating abutment for the endwise location of the seal 82 when used and being capable of deflection when the end 88 of the cutter 87 is lifted to shear the upper layer 83 of the strapping.

When the tool is in use hydraulic pressure generated in the above described hydraulic cylinder 33 is utilised in the cylinder 43 to effect a succession of movements of the ram 46 and the tensioning device 54, 55, 56, in the tensioning direction i.e. to the right in FIG. 2, return movements to the left being made by compressed air introduced to the cylinder 43. When a desired degree of tensioning of the loop of strapping has been achieved the hydraulic pressure is thereafter caused to take effect in the cylinder 66 to effect jointing of the tensioned loop of strapping and severing of the jointed loop from the remainder of the strapping.

The means for effecting the automatic pressure-transmission change is as follows:

In the head 5 of the tool and above the jointing cylinder 66 is mounted a pressure-responsive valve 93 capable of up and down movement in a fixed sleeve 94, the interior of which in the down position of the valve 93, is in communication through a passage 95 and a vertical passage 96 (FIGS. 2, 10 and 16) with one of the outlets of port 36 at the outlet end of the delivery tube 35 of the hydraulic motor, and also through ports 97 with a conduit 98 (FIGS. 2, 14 and 15) leading to the tensioning cylinder 43.

The lower end of the pressure-responsive valve 93 is of double-ended form to seat either with its upper end against the lower edge of the fixed sleeve 94 when raised as shown in FIG. 16 or with its lower end which is conical, seated in the entrance to an aperture 102 leading through the upper end closure 67 to the interior of the jointing cylinder 66, when lowered (FIGS. 2, 9 and 10).

The valve 93 is loaded downwards by a compression spring 103, the pressure of which is adjustable by means of a screwed plug 134 accessible from above the head 5 and rotatable with reference to an indicator scale.

The portion of the pressure-responsive valve 93 moving within the fixed sleeve 94 constitutes a piston the area of which is greater than that of the entrance to the aperture 102 leading to the interior of the jointing cylinder 66 and equal to that of the lower entry end of the fixed sleeve 94 so that on attainment of a given pressure in the conduit 95 the valve 93 will be raised in opposition to the spring 103 and a pressure differential will exist between the upper and lower sides of the valve 93 such as to maintain it in the raised position of FIG. 16.

With the pressure-responsive valve 93 in its lowered position (as shown in FIGS. 2, 9 and 10) hydraulic pressure oil from the pump cylinder 33 by way of conduit 95 is directed over the lower end of the valve to ports 97 and thence by way of the conduit 98 to the tensioning cylinder 43 and the main aperture 102 to the jointing cylinder 66 is sealed off by the valve, and with the valve 93 in its raised position access of pressure oil from conduit 95 to the ports 97 and the tensioning cylinder 43 is cut off by engagement of the upper side of the end of the valve with the end of fixed tube 94 (FIG. 16) and the pressure oil may pass by way of main aperture 102 to the jointing cylinder 66.

A secondary or return conduit 100 containing a one-way valve 101, FIGS. 13, 14 and 15, is connected between the conduit 98 and one of the ports 36 at the end of the tube 35 connected with the hydraulic motor cylinder 33.

The vertical passage 96 (FIGS. 2, 9, 10 and 13) between the delivery port 36 from the hydraulic pump 33 and the passage 95 leading to the pressure-responsive valve 93 contains a spring-loaded non-return valve 99 at its upper end and is closed at its lower end by a spring-loaded poppet valve 104 having a stem 105 at the underside extending through the upper end closure 67 of, and for a short distance into, the joining cylinder 66 so that the stem 105 may be engaged by the ram 69 of the joining cylinder and the valve 104 held up off from its seating during a predetermined short early part of a downward stroke of the ram 69 from a fully raised position in the cylinder 66.

The valve 104 constitutes a by-pass valve such that when held off its seating in the manner described above hydraulic pressure oil from the pump cylinder 33 is permitted to enter the jointing cylinder 66 to move the ram 69 a limited distance downwards while the pressure-responsive valve 93 is still in the down position closing the main aperture 102 leading to the jointing cylinder 66.

Control of the tool is by means of a push-button 106 (FIGS. 1, 3, 4, 5 and 13) and accessible at the upper end of the head 5 of the tool for depression by the thumb of the hand holding the tool and whilst operation of the tool can be stopped at any time by release of the push-button 106 it is only necessary to maintain the push-button depressed to carry out the complete binding operation including tensioning, jointing and severing.

The push-button 106 is mounted upon a lever 107 (FIGS. 3, 4 and 5) capable of rocking about a pivot 108, and the free end of the lever 107 is arranged to engage and depress a spring-loaded plunger 109 movable in a vertical tubular housing 110 at the lower end of which is mounted a double-ended pilot valve 111 co-operating with the ends of a tube 112 in the lower end of housing 110.

An annular space 113 surrounds the tube 112 and ports 114 lead from said space 113 to the interior of the tube 112 of the pilot valve 111.

An air tube 115 is mounted with clearance in a passage 116 formed in the support body (FIGS. 2, 9 and 11) the tube 115 communicating at one end through a port 117 with the space in the air cylinder 4 at the left-hand side of the air piston 11 in the drawings and at the other end with a passage 118 leading to the annular space 113 outside the tube body 112 of the pilot valve 111.

The passage 116 outside the tube 115 communicates at one end through a port 119 with the passage 120 in the space tube 9 surrounding the tie bolt 7, and at the other end with a manifold 121 (FIG. 9) formed conveniently in the fixed insert 49 of the supporting body structure and distributing on the one hand by way of a passage 122 to the air space in the tensioning cylinder 43 at the right-hand side of the tensioning ram 46 on the other hand by a passage 123 to a space at the underside of the pilot valve 111 and thence by way of a restrictor valve 124 to the space in the jointing cylinder 66 below the jointing ram 69.

The lever 107 carrying the push button 106 is pivotally connected with a plunger 125 (FIG. 4) controlling a relief valve 126 in an oil passage between the oil space above the ram 69 in the jointing cylinder 66 and the oil reservoir 37, the valve 126 being normally held closed whilst the push button 106 is depressed. The valve 126 permits oil to return from the jointing cylinder 66 to the reservoir 37 when the push button 106 is released and it also functions as a safety valve capable of opening if excessive pressure is applied to the tool, the pivot 108 of the lever 107 being provided on a spring-loaded plunger 127 as shown in FIG. 4 to permit valve 126 to open under such excessive pressure.

An exhaust port 128 (FIGS. 7, 10 and 12) is provided between the space inside the air cylinder 4 at the left-hand side of piston 11 and atmosphere, the said port being controlled by a valve 129 and the valve being held in a position closing the port 128 by the pressure of air in the space 120 in spacer tube 9 whilst that space remains pressurised, and opening to permit air to exhaust through the port 128 from the space in air cylinder 4 at the left-hand side of the piston 11 when the space in the tube 120 is no longer pressurised.

In using the tool to make a sealed joint of the form shown in FIG. 17 using a seal as shown in FIG. 18, the free end of the strapping is fed through a seal 82 and thereafter looped about the box or package to be bound and the free end of the strapping again passed from below through the seal 82 and in the same direction as previously, and the extremity of the strapping bent to form a hook as shown at 130 in FIG. 2 engaged over the forward end of the seal 62 to anchor the free end of the strapping.

With the tool connected with the air line, air pressure on, and the control button 106 released, e.g. after completion of a previous binding operation, the air piston 11 will be in a position corresponding to a partially executed return stroke i.e. towards the right in the air cylinder 4, so that no hydraulic pressure is being delivered by the pump 33, the reciprocating member 16 of the change-over valve 10 is in its left-hand position as shown in FIGS. 11 and 12 so that compressed air is being delivered by way of the space 120 in the tube 9 surrounding the tie bolt 7, port 119, space 116 surrounding the tube 115, manifold 121 and conduit 122 to the space in the tensioning cylinder 43 at the right-hand side of the ram 46 and this air pressure assisted by the spring 52 causes the ram 46 to make a full return stroke to a position nearer to the left-hand closure 44 of the cylinder 43 than that shown in FIG. 2. In this position the upper end of the lever 61 is engaged with the fixed abutment 63 and the lever rocked clockwise from the position shown in FIG. 2 to rock and hold the pawl 56 in a position in which the lower serrated face is spaced from the anvil 55, and the nose 65 on the pin 64 is engaged with pawl 60 to rock and hold it similarly with its lower serrated face spaced from the anvil 59 of the one-way gripping device.

At the same time compressed air is applied by way of the passage 123 to the underside of the pilot valve 111 to hold it raised and to the space in the jointing cylinder 66 below the ram 69 by way of restrictor valve 124 so that the jointing or sealing ram 69 is held in its raised position.

In the raised position of the pilot valve 111 access of compressed air to the ports 114, the annular space 113 surrounding the pilot valve tube 112 and to conduit 115 (FIG. 11) leading to the air cylinder 4 is prevented.

In the raised position of the ram 69 of the jointing cylinder 66 resulting from application of air pressure beneath the ram 69, the toggle levers 75 of the jointing device are held in a vertically elongated condition in which the opposed teeth 78 are spaced apart and away from the lower recessed edges of the bars 79.

In this raised position of the jointing ram 69 it is engaged with the stem 105 of the by-pass valve 104 so that the latter is held up and open.

The screw plug 134 is adjusted to determine the pressure of the spring 103 acting on the pressure-responsive valve 93 according to the degree of tension required to be applied in the loop of strapping about the box or package now to be bound.

To tension, seal and sever the loop of strapping looped about the box or package in the manner described above, the tool is placed in position with the recesses in the lower edges of the bars 79 at the lower end of the head part 5 of the tool resting upon the seal 82 and the lower face of the cutter 66 resting upon the lower of the overlapping parts of the looped strapping at the rear of the seal 82 as shown in FIG. 2.

The upper of the overlapping parts of the strapping between the seal 82 and the source of strapping, indicated by 131 in FIG. 2, is introduced from one side over the anvils 55 and 59 and below their respective open pawls 56 and 60.

The control button 106 is now depressed to open the pilot valve 111 by disengagement of its lower end from the tube 112, and close the relief valve 126.

The air piston 11 is required to complete the return stroke during which it was previously halted, i.e. its movement to the right in the air cylinder 4 in FIG. 2.

Depression of the button 106 and opening of the pilot valve 111 opens passage for compressed air from the air line 13 directed by the still unmoved change-over valve 10 to the manifold 121, passage 123, ports 114, annular space 113 and tube 115 to the space in the air cylinder 4 at the left-hand side of the air piston 11, see FIG. 11. When the above described circuit is pressurised exhaust valve 129 is caused to move to its closed position and air pressure is meantime maintained in the tensioning and jointing cylinders 43 and 66.

The air piston 11 is then caused to make or complete a return stroke i.e. a movement towards the right in the drawings, air in the cylinder 4 at the right-hand side of the piston being permitted to exhaust to atmosphere through vents through the end cap 6, see 18 and 19 in FIG. 12, which are uncovered whilst the reciprocating member 16 of the change-over valve 10 remains in the left-hand position thereof as shown in FIGS. 11 and 12.

Movement of the air piston 11 in the manner involves movement of the hollow plunger 12 in the cylinder 33 of the hydraulic pump such as to draw oil from the reservoir 37 into the cylinder 33 of the hydraulic pump, by way of the conduit 41 (FIG. 11) containing the non-return valve 42.

After movement of the piston 11 of predetermined extent the reciprocating member 16 of the change-over valve 10 is moved by the slider 21 and associated parts in the manner previously described, to the right into its alternative position as shown in FIGS. 2, 9 and 10, in which position compressed air from the air line 13 is directed by the change-over valve 10 directly into the space in the air cylinder 4 at the right-hand side of the air piston 11 and communication between the compressed air line 13 and the previously described circuit including the pilot valve 111 is also interrupted by the transfer movement of the change-over valve 10 so that compressed air from the line 13 no longer reaches the space at the left-hand side of the air piston 11.

At the same time the circuit including the pilot valve 111 and the space 116 and space 120 is put into communication with atmosphere through vents uncovered by the change-over valve 10, see 19 in FIG. 10, so that air pressure is relieved in that circuit as well as from the right-hand side of the tensioning ram 46 and below the jointing ram 69, and with pressure relieved in the said circuit including the pilot valve 111 the auxiliary exhaust valve 129 held closed whilst that circuit is pressurised, moves to open exhaust port 128, see FIG. 10, under the exhaust pressure from space at the left-hand side of air piston 11. Thus back pressure on the air piston 11 during its working stroke towards the left in the drawings is rapidly reduced to a minimum.

As the piston 11 moves towards the left, pressure oil is delivered from the pump cylinder 33 by way of oil tube 35 to one of the outlets of the port 36, to space 96, and port 95 on its way to the pressure-responsive valve 97, the latter being in its down position under the urge of the spring 103.

The jointing ram 69 being fully raised the by-pass valve 104 between the space 96 and the port 95 is held open as shown in FIG. 9 by engagement of its stem 105 with the upper side of the ram 69, so that pressure oil enters the space in the cylinder 66 above the ram 69 and the first movement therefore is a downward movement of limited extent of the ram 69 to the position shown in FIG. 2 and the toggle levers 75 are operated to move the teeth 78 in the lower members 76 of the toggle levers into engagement with the seal 82.

This downward movement of the ram 69 ceases when the by-pass valve 104 is permitted to close through disengagement of the ram 69 from the valve stem 105.

During movement of the jointing ram 69 to effect this preliminary closing movement of the teeth on to the seal, a return stroke of the pump plunger 12 before the by-pass valve 104 has closed could be accompanied by a forcing back of oil from the jointing cylinder 66 through the by-pass valve 104, passage 95, pressure valve 93, port 97, non-return valve 10, port 36 and tube 35 to the pump cylinder 33 by an excessive air pressure beneath the jointing ram 69.

To avoid such forcing back of oil, the restrictor valve 124, which allows air to exhaust freely from beneath the jointing ram 69 during a working stroke, restricts the flow of air during a return stroke so that pressure does not build up so rapidly under the jointing ram 69 as to force oil back into the pump cylinder 33, and the pump plunger 12 therefore draws oil from the reservoir 37.

The preliminary partial closing of the teeth on to the seal 82 ensures maintenance of the tool in proper alignment with the strapping for tensioning and also affords some measure of support for the seal to take the reaction to the tensioning forces.

Should the tool be improperly located or the moving toggle levers 75 meet any obstruction whilst the by-pass valve 104 is still open, a build-up of excessive pressure in the jointing cylinder 69 cannot occur since the pressure oil passes from space 96 through port 95, over the lower end of the pressure-responsive valve 93, still in its down position, to ports 97 and conduit 98 to the tensioning cylinder 43 to move the tensioning ram 46 to the right to a small extent against the spring 52 which therefore limits the extent of pressure build-up.

With the tool correctly located downward movement of the jointing ram 69 to make locating engagement of the teeth 78 with the seal 82 ceases when the by-pass valve closes and all oil pressure takes effect on the ram 46 in the tensioning cylinder 43.

The ram 46 and the parts connected therewith are thus moved in the tensioning direction i.e. to the right in FIG. 2, the lever 61 disengaging from the fixed abutment 68 so that the pawl 56 may rock to grip the upper overlapping part of the strapping against the anvil 55 and the upper overlapping part of the strapping is thereafter drawn in the tensioning direction.

Early movement of the tensioning ram 46 also disengages the nose 65 from the rocking pawl 60 of the one-way gripping device 59, 60 so that the pawl 60 takes the operative position shown in FIG. 2 in which the strapping 58 can be drawn freely through the one-way gripping device 59, 60, by the tensioning grippers 55, 56, but will be held against return movement when the grip of the tensioning grippers 55, 56, on the strapping is released.

On completion of the working stroke towards the left of the air piston 11 and the hydraulic pump plunger 12, the reciprocating member 16 of the change-over valve 10 is moved as previously described to its left-hand position shown in FIGS. 11 and 12 so that again compressed air is introduced to the space in air cylinder 4 at the left of the piston 11 in FIG. 2 and to the space at the right of the ram 46 in the tensioning cylinder 43, and the space in cylinder 4 at the right of piston 11 is vented to atmosphere as previously described. Thus the plunger 12 of the hydraulic pump is withdrawn to the right in FIG. 2 and the pump cylinder 33 is recharged with oil recovered from the tension cylinder 43 the ram 46 of which is being moved to the left by compressed air assisted by the return spring 52.

During recovery of oil by the pump cylinder 33 from the tensioning cylinder 43 the non-return valve 99 in the space 96 closes and recovery flow takes place through what may be referred to as a short circuiting conduit 100 (FIGS. 13 and 15) containing a non-return valve 101, providing free flow for the returning oil.

As the ram 46 approaches the end of the first return stroke it partially covers the end of the oil passage 98 leading to and from the cylinder 43 so that the return oil flow from the cylinder 43 to the pump cylinder 33 is cut down and further oil is drawn by the pump from the reservoir 37 by way of conduit 41 and non-return valve 42.

The volume of the oil-receiving space in the tensioning cylinder 43 is slightly larger than that of the pump cylinder 33 so that after the first tensioning stroke, the ram 46 will reciprocate over a path in which the return stroke terminates short of the end closure 44 of the oil space of the cylinder 43 by a distance which avoids engagement of the lever 61 with the abutment 63 and the nose 65 with the pawl 60 so that the pawls 56 and 60 remain free to function in the required manner upon the upper overlapping part of the strapping.

With the push button 106 held depressed, the air piston 11, the pump plunger 12 and the tensioning ram 46 continue to reciprocate so that the loop of strapping around the box or package being bound is contracted and finally tensioned step by step.

When the tension in the strapping reaches the desired magnitude, determined by the setting of the compression spring 103 by the member 134, the resistance offered by the tensioned loop of strapping to movement of the tensioning ram 46 results in a build-up in pressure in the oil circuit between the pump 33 and the ram 46 such as to take effect upon the piston-forming portion of the pressure-responsive valve 93 slidable in the fixed sleeve 94 containing the ports 97, and causes the valve 93 to rise against the pressure of the pre-set spring 103.

The lower end of the valve 93 is raised into closing contact with the lower end of the sleeve 94 as shown in FIG. 16 to shut off communication between the pump 33 and the tensioning cylinder 43 and at the same time to open the main port 102 leading to the space in the jointing cylinder 66 above the ram 69.

With the tensioned loop of strapping held by the one-way gripping device 59, 60, the jointing ram 69 operates through the plunger 70 and plates 72 upon the toggle levers 75 to urge the teeth 78 on the lower toggle members 76 about the pivots 77 and into strong engagement with the undersides of the edges of the seal 82 to press the seal and the overlapping parts of the strapping enveloped thereby against the projections 80 at the ends of the recesses in the fixed bars 79 (FIGS. 19 and 20) to join the ends of the loop by crimping or deforming the seal and strapping in the manner shown in FIGS. 17 and 18.

As the crimping or deforming approaches completion the shaped ends or teeth 78 of the rearmost pair of lower toggle members 76 make engagement beneath the side edges of the cutter member 87 near the cutting end 88 thereof to raise the cutting end about the pivot 89 so that the upper overlapping part of the strapping is sheared by movement of the cutting end 88 of the cutter past the rear edge of the seal 82 whilst the latter is bolstered by the shallow V recess 81 in the rearmost fixed bar 79. The end 92 of the locating leaf spring 90 is capable of upward displacement to permit this cutting operation.

The push button 106 may now be released and if this should occur during a working stroke of the air piston 11 and the hydraulic pump plunger 12 the working stroke is completed so that the reciprocating member 16 of the change-over valve 12 is moved to its left-hand position and the pilot valve 111 being closed the air piston 11 comes to rest in a position ready for a first or completion of a return stroke when the next binding operation is commenced.

Any excess hydraulic pressure delivered by the hydraulic pump during the completion of the working stroke will be relieved by opening of the relief valve 126 permitting the return of oil to the reservoir 37. Similarly if the button 106 is not released immediately the binding, jointing and cutting operations are completed excess pressure delivered by the pump will be relieved by opening of the relief valve 126.

With the pilot valve 111 raised and closed, pressure in the conduits 115 and 117 connected between the space in air cylinder 4 at the left of piston 11 and the annular space 113 surrounding the pilot valve sleeve 112 is relieved through the ports 114 functioning as bleed holes to atmosphere past the rod 109 in tube 110, so that after a movement of limited extent of the air piston 11 in the return direction the air piston comes to rest.

Compressed air continues to be applied in the tensioning cylinder 43 and in the jointing cylinder 66 and in the case of the jointing cylinder 66 the compressed air enters from passage 123 (FIG. 4) by way of the restrictor valve 124 the restriction of which is limited to the extent that it does not prevent return of oil from above the jointing ram 69 in jointing cylinder 66 to the reservoir 37.

The speed of the return stroke from left to right of the air piston 11 is governed by the relief of air pressure through the ports 114 at the pilot valve 111 to atmosphere and this is regulated so that a vacuum is not drawn by the pump plunger 12 in the pump cylinder 33 in any return stroke of the piston 11 during operation.

Compressed air and the pressure of the spring 52 acting upon the tensioning ram 46 in tensioning cylinder 43, the tensioning ram 46 in the absence of pressure by the hydraulic pump becomes capable of moving to its full extent in the tensioning cylinder 43 in the direction to the left in FIG. 2 so that the upper end of the lever 47 meets the fixed abutment 63 and the lower end of the lever meets and rocks the gripping tensioning pawl 56 into the open position in which its operative serrated face is spaced from the anvil 55, and the nose 65 meets the pawl 60 of the one-way gripping device to rock pawl 65 to the open position in which its operative serrated face is spaced from the anvil 59.

During this movement the tool can be disengaged from the tensioned and jointed loop and it is also made ready for engagement with strapping placed about the next case or bale to be bound.

The leaf spring 69 engaged by the rear end of the seal 82 may in some cases be dispensed with but in a case such as that illustrated it ensures location of the rear end of the seal out of the path of the cutter and takes the reaction of tensioning.

When a seal-less joint of the form shown in FIGS. 24 to 27 is to be made the tool is provided at the forward end of the underside thereof with a fixed block 132 (FIGS. 26 and 27) having a slot 133 in the forward side thereof for the reception of a bent portion 135 of the free end of the strapping in order to anchor that free end, and the upper surface of the block 132 is spaced from the under side of the head portion 5 of the tool to permit the overlapping parts of the loop of strapping to pass over said surface. With recessed bars 79 having inclined edges 86 (FIG. 27) as previously described applied on the head of the tool, the operations of tensioning, jointing with a seal-less joint, and cutting are carried out with the tool in the same manner as previously described.

Bleed points may be provided rendering the hydraulic system virtually self bleeding once filled and provided that the tool is used in any position other than that with the head portion uppermost.

One such bleed point is the previously described vent 40 from the oil reservoir chamber 37, which is uncovered by the spring-loaded piston 38 forming one end of that reservoir chamber and which allows accumulated air to escape.

The vent 40 also affords an indication when the reservoir has become filled after topping up with oil.

A further screw-filled bleed point 136 (FIG. 2) is provided through the forward end wall of the reservoir 37 in a position where it is accessible when the removable top cover of the head portion 5 of the tool is removed.

A third bleed point may be provided in the form of a small non-return valve 137 in an aperture at the upper end of the passage 96 containing the by-pass valve 104.

I claim:

1. A tool for use in binding articles with a closed loop of tensioned strapping, comprising a supporting body, an hydraulic pump carried by said supporting body and a pneumatic motor carried by said supporting body and driving said hydraulic pump, means for tensioning the strapping including a first cylinder carried by said supporting body a first ram reciprocable in said first cylinder and gripper means connected for movement with said first ram, and means for jointing overlapping ends of the loop of strapping including a second cylinder carried by said supporting body, a second ram reciprocable in said second cylinder and movable jointing elements coupled with said second ram, a conduit including a first branch leading pressure liquid from the hydraulic pump to one side of the first ram in the first cylinder and a second branch leading pressure liquid from the hydraulic pump to one side of the second ram in the second cylinder, movable pressure-responsive control means in said conduit movable between a first position in which said first branch is open and pressure liquid from said hydraulic pump has access to said first cylinder and said first ram to move said gripper means to tension the strapping and the said second branch is closed by said movable pressure-responsive control means, and a second position in which said first branch is closed by said movable pressure-responsive control means and said second branch is open and pressure liquid from said hydraulic pump has access to said second cylinder and said second ram to move said movable jointing elements to join overlapping parts of the tensioned strapping.

2. A tool as claimed in claim 1 and comprising a cylinder formed in said second branch, a movable pressure-responsive means including a spring loaded piston valve axially movable in said cylinder between two positions in one of which the cylinder is closed by said piston valve and in the other of which said cylinder is open.

3. A tool for use in binding articles with a closed loop of tensioned strapping, comprising a supporting body, an hydraulic pump carried by said supporting body and a pneumatic motor carried by said supporting body and driving said hydraulic pump, means for tensioning the strapping including a first cylinder carried by said supporting body a first ram reciprocable in said first cylinder and gripper means connected for movement with said first ram, means for jointing overlapping ends of the tensioned loop of strapping including a second cylinder carried by said supporting body, a second ram reciprocable in said second cylinder and movable jointing elements coupled with said second ram, a liquid conduit including a first branch leading pressure liquid from said hydraulic pump to one side of said first ram in said first cylinder and a second branch leading pressure fluid from said hydraulic pump to one side of said second ram in said second cylinder, an air-conduit leading pressure air from said pneumatic motor to the other side of said first ram in said first cylinder and an air conduit leading pressure air from said pneumatic motor to the other side of said second ram in said second cylinder, movable pressure-responsive control means in said liquid conduit movable between a first position holding said first branch open and said second branch closed and a second position holding said first branch closed and said second branch open and movable from said first to said second position in response to achievement of a pre-determined hydraulic pressure in said first cylinder and said first branch.

4. A tool for use in binding articles with a closed loop of tensioned strapping as claimed in claim 3 and including a spring biasing said movable pressure-responsive control means towards the said first position and means for varying the bias of said movable pressure-responsive control means by said spring.

5. A tool for use in binding articles with a closed loop of tensioned strapping, comprising a supporting body, an hydraulic pump carried by said supporting body and a pneumatic motor carried by said supporting body and driving said hydraulic pump, means for tensioning the strapping including a first cylinder carried by said supporting body a first ram reciprocable in said first cylinder and gripper means connected for movement with said first ram, means for jointing overlapping ends of the tensioned loop of strapping including a second cylinder carried by said supporting body, a second ram reciprocable in said second cylinder and movable jointing elements coupled with said second ram, a liquid conduit including a first branch leading pressure liquid from said hydraulic pump to one side of said first ram in said first cylinder and a second branch leading pressure fluid from said hydraulic pump to one side of said second ram in said second cylinder, an air-conduit leading pressure air from said pneumatic motor to the other side of said first ram in said first cylinder and an air conduit leading pressure air from said pneumatic motor to the other side of said second ram in said second cylinder, movable pressure-responsive control means in said liquid conduit movable between a first position holding said first branch open and said second branch closed and a second position holding said first branch closed and said second branch open and movable from said first to said second position in response to achievement of a pre-determined hydraulic pressure in said first cylinder and said first branch, a by-pass by which pressure liquid from said hydraulic pump is applied to said one side of said second ram in said second cylinder to impart a limited preliminary movement to said second ram prior to movement of said pressure-responsive control means from its first to its second position to close the first branch and open the second branch, and closure means controlled by said second ram and closing said by-pass after a limited preliminary movement of said second ram has brought the said jointing means into contacting engagement with the strapping.

6. A tool for use in binding articles with a closed loop of tensioned strapping comprising a supporting body, an hydraulic pump carried by said supporting body and a motor carried by said supporting body and driving said hydraulic pump, means for tensioning the strapping including a first cylinder carried by said supporting body, a ram movable in one direction in said cylinder by hydraulic pressure from said pump, an anvil member moved by said ram and rockable strapping engaging pawls on said anvil member and co-operating with said anvil member to grip the strapping and to tension it during movement of said ram in said one direction, means effecting return movement of said ram, said anvil member and said rockable strapping engaging pawls in unison, means limiting the extent of said return movement during the strapping tensioning phase of operation of the tool, means for jointing overlapping ends of the tensioned loop of strapping comprising a second cylinder carried by said supporting body, a second ram movable in one direction in said second cylinder by hydraulic pressure from said pump, strapping deforming elements connected for movement with said second ram to deform and join the overlapping ends of the strapping during movement of said second ram in one direction in said second cylinder, means imparting an extension of the return movement of said first mentioned ram in the first cylinder subsequent to the joining of the overlapping portions of the strapping by said strapping deforming element and abutment means engaging the rocking strapping-engaging pawls during such extension of the return movement of said first mentioned ram to rock said pawls away from gripping engagement with the strapping.

7. A power operated hand tool for use in binding articles with a loop of tensioned strapping, said tool comprising a supporting body, means for tensioning the strapping including one-way gripping means mounted for reciprocation on said supporting body to grip and move the strapping with a succession of movements in one direction relative to said supporting body, jointing means carried by said body to engage and join overlapping parts of the tensioned strapping, means including a hydraulic pump carried by said supporting body for imparting a succession of tensioning movements to said gripping means in said one direction and thereafter actuating said jointing means with respect to said supporting body, a pneumatic motor carried by said supporting body for driving said hydraulic pump and control means carried by said supporting body and operative in response to achievement of a pre-determined tension in the strapping to interrupt movement of said gripping means by said hydraulic pump and initiate operation of said jointing means by said hydraulic pump.

8. A power operated hand tool for use in binding articles with a loop of tensioned strapping, said tool comprising a supporting body, means for tensioning the strapping including one-way gripping means mounted for reciprocation on said supporting body to grip and move the strapping with a succession of movements in one direction relative to said supporting body, jointing means carried by said body to engage and join overlapping parts of the tensioned strapping, severing means carried by and movable with respect to said supporting body to sever the strapping, means including a hydraulic pump carried by said supporting body for imparting firstly a succession of tensioning movements to said gripping means in said one direction, secondly, actuating said jointing means to join overlapping parts of the tensioned strapping and thirdly, actuating said severing means to sever the tensioned and jointed portion of the strapping from the remainder, a pneumatic motor carried by said supporting body for driving said hydraulic pump and control means carried by said supporting body and operative in response to achievement of a pre-determined tension in the strapping to interrupt movement of said gripping means by said hydraulic pump and initiate operation of said jointing means by said hydraulic pump.

9. A power operated hand tool for use in binding articles with a loop of tensioned strapping, said tool comprising a supporting body, means for tensioning the strapping including one-way gripping means mounted for reciprocation on said supporting body to grip and move strapping with a succession of movements in one direction relative to said supporting body, jointing means carried by said body to engage and join overlapping parts of the tensioned strapping, severing means carried by and movable with respect to said supporting body to sever the strapping, means including a hydraulic pump carried by said supporting body for imparting firstly a succession of tensioning movements to said gripping means to tension the strapping, secondly, actuating said jointing means to join overlapping parts of the tensioned strapping and thirdly, actuating said severing means to sever the tensioned and jointed part of the strapping from the remainder, a pneumatic motor carried by said supporting body for driving said hydraulic pump and control means carried by said supporting body and operative in response to achievement of a pre-determined tension in the strapping to interrupt movement of said gripping means by said hydraulic pump and initiate operation of said jointing means by said hydraulic pump to join the overlapping parts of said strapping and thereafter sever the tensioned and jointed loop of strapping from the remainder of the strapping.

10. A power operated hand tool for use in binding articles with a loop of tensioned strapping comprising a supporting body, a hydraulic pump carried by said supporting body, a pneumatic motor carried by said supporting body for driving said hydraulic pump, means for tensioning the strapping including a first cylinder carried by said supporting body, a ram movable in one direction in said cylinder by hydraulic pressure from said pump, pneumatic means effecting movement of said ram in said first cylinder in the other direction, gripping means connected to said ram for gripping the strapping and moving it during movement of the ram in said one direction by pressure from said pump to tension the strapping, means for jointing overlapping ends of the tensioned loop of strapping comprising a second cylinder carried by said supporting body, a second ram movable in one direction in said second cylinder by hydraulic pressure from said pump, and strapping-deforming elements connected to said second ram to deform and join the overlapping ends of the strapping during movement of the second ram in said one direction in said second cylinder.

11. A power operated hand tool for use in binding articles with a loop of tensioned strapping having a free end portion and a feed end portion overlapping and initially extending past the free end portion to a strapping supply, said tool comprising a supporting body, means for tensioning the strapping including one-way gripping means mounted for reciprocation with respect to said supporting body to grip and move the strapping during a succession of movements of said gripper means in one direction with respect to the supporting body, jointing means carried by said supporting body to engage and join overlapping parts of the strapping, a movable cutter member carried by said supporting body in a position between the loop and the initially extending feed end portion of the strapping and having a cutting edge positioned close to said jointing means at the side thereof to which the strapping is fed to the tool, cutter actuating means carried by said supporting body to move the cutting edge of said cutter member away from the loop across the path of movement of strapping fed to the tool and preceding the loop, means including a hydraulic pump carried by said supporting member for imparting a succession of movements to said gripping means in said one direction to tension the strapping, followed by sequential actuation of said jointing means to join overlapping parts of the tensioned strapping and actuation of said cutter member to cut the strapping, and a pneumatic motor carried by said supporting body for driving said hydraulic pump.

12. A hand tool for use in binding articles with a loop of tensioned strapping closed by a seal in retaining engagement with overlapping free and feed end portions of the loop, said tool comprising a supporting body, means for tensioning the strapping including gripping means carried by said supporting body to grip and move the feed end portion of the strapping in one direction relative to said body, means locating the seal applied about the overlapping portions of the strapping relative to the supporting body during such tensioning of the strapping by said gripping means, jointing means carried by and movable with respect to said supporting body to engage and deform the seal and overlapping parts of the strapping enveloped thereby to join said overlapping parts and form the closed loop, a cutter member carried by said supporting body in a position between the loop of strapping and the path of strapping fed to the tool and movable with respect to said supporting body by said jointing means in the direction away from the loop toward the feed end portion thereof, said cutter member including a cutting edge adapted to be located adjacent one end of the seal for movement in a path across the feed end of the strapping and co-operating with said one end of the seal to shear the tensioned loop of strapping from the remainder of the strapping at a point closely adjacent the seal.

13. A power operated tool for use in binding articles with a loop of tensioned strapping, said tool comprising a supporting body having means thereon for engaging a free end of the strapping loop, means for tensioning the strapping including gripping means mounted for reciprocation on said body and first hydraulic motor means for driving said gripping means to grip and move the strapping with a succession of movements in one direction relative to said body, jointing means carried by said body to engage and join overlapping portions of the tensioned strapping, second hydraulic motor means for driving said jointing means, a hydraulic pump carried by said supporting body for supplying working fluid to said hydraulic motor means, a pneumatic motor carried by said supporting body for driving said hydraulic pump, conduit means connecting said hydraulic pump and said hydraulic motor means, and control valve means carried by said supporting body for directing working fluid to said first hydraulic motor means and operative in response to predetermined tension in the strapping to direct working fluid also to said second hydraulic motor means from said hydraulic pump to interrupt movement of said gripper means and initiate operation of said jointing means.

14. The apparatus recited in claim 13 in which said control valve means operates in response to back pressure from said first hydraulic motor means.

15. A power operated portable hand tool for use in binding articles with a loop of tensioned strapping and capable of being held and operated with one hand, said tool comprising a supporting body having means thereon for engaging a free end of the strapping loop, means for tensioning the strapping including gripping means mounted for reciprocation on said body and first hydraulic motor means for driving said gripping means to grip and move the strapping with a succession of movements in one direction relative to said body, jointing means carried by said body to engage and join overlapping portions of the tensioned strapping, second hydraulic motor means for driving said jointing means, a hydraulic pump carried by said supporting body for supplying working fluid to said hydraulic motor means, a pneumatic motor carried by said supporting body for driving said hydraulic pump, conduit means connecting said hydraulic pump and said hydraulic motor means, and control valve means carried by said supporting body for directing working fluid to said first hydraulic motor means and operative in response to a predetermined tension in the strapping to direct working fluid also to said second hydraulic motor means from said hydraulic pump to interrupt movement of said gripper means and initiate operation of said jointing means.

16. A power operated hand tool for use in binding articles with a loop of tensioned strapping, said tool comprising: a supporting body including spaced upper and lower hollow parts, a head portion connecting the forward ends of said parts and a bridge portion connecting the rearward ends thereof, said upper part defining a handle for carrying and operating the tool; means for anchoring a free end of the strapping loop under said head portion; means for tensioning the strapping including movable gripping means carried by said lower part of said body; jointing means carried by said head portion to engage and join overlapping parts of the tensioned strapping; means including a hydraulic pump positioned in said upper part for delivering hydraulic working fluid to said gripping means for tensioning movement thereof and to said jointing means for actuation thereof; a pneumatic motor also carried in said upper part for driving said hydraulic pump; and control means operative in response to achievement of a predetermined tension in the strapping to interrupt movement of said gripping means by said hydraulic pump and initiate operation of said jointing means by said hydraulic pump.

17. The hand tool recited in claim 16 in which said control means includes a push-button actuator positioned on said head portion adjacent said upper part.

18. In an apparatus for forming a loop in strapping having overlapping free and feed end portions to be closed by a seal deformed in retaining engagement with the overlapping end portions, the feed end portion initially extending to the strapping supply, means for severing the strapping between the formed loop and the strapping supply comprising: a supporting element positioned to overlie the seal and the overlapping end portions of the strapping engaged by the seal, said supporting element being engageable with the external surface of the seal; a cutter member mounted to be positioned between the loop of strapping and extending feed end portion thereof, said cutter member having a shearing edge; means for locating the seal lengthwise relative to said supporting element and with an end edge of said seal positioned in cooperable shearing relation with the shearing edge of said cutter member; and means for effecting relative movement between the shearing edge of said cutter member and said supporting element in a direction to bring the shearing edge of said cutter member and said end edge of the seal into cooperative shearing engagement with the extending feed end portion of the strapping.

19. In an apparatus for forming a loop in strapping having overlapping free and feed end portions closed by a seal in retaining engagement with the overlapping end portions, the feed end portion initially extending to the strapping supply, means for deforming the seal to join the overlapping ends of the strapping engaged thereby and for severing the strapping between the loop and the strapping supply comprising; a fixed supporting element positioned to overlie the seal and the overlapping end portions of the strapping engaged by the seal, said fixed supporting element abutting the external surface of the seal; a movable jointing member having inwardly extending teeth adapted to underlie the seal and the overlapping end portions of the strapping engaged by the seal, said teeth being movable toward said fixed supporting element and cooperable therewith to deform the seal and said overlapping end portions to join said overlapping end portions; a movable cutter member mounted to be positioned between the loop of strapping and the extending feed end portion thereof, said movable cutter member having a shearing edge; means for locating the seal lengthwise relative to said fixed supporting element and with an end edge of said seal positioned to cooperate in shearing relation with the shearing edge of said cutter member; and means for moving the shearing edge of said cutter towards said fixed supporting element and across said end edge of the deformed seal to shear the extending feed end portion of the strapping from the loop.

20. Apparatus according to claim 19, wherein said means for moving the shearing edge of said cutter comprises further inwardly extending teeth on said movable jointing member adapted to underlie said movable cutter member, said further teeth being movable to move said movable cutter member and the shearing edge thereof towards said fixed supporting element and across said one edge of the seal following deformation of the seal by said first-mentioned teeth on said movable jointing member, to shear the extending feed end portion of the strapping from the loop.

21. In an apparatus for forming a loop in strapping having overlapping free and feed end portions to be closed by a seal deformed in retaining engagement with the overlapping end portions, the feed end portion initially extending to the strapping supply, means for severing the strapping between the formed loop and the strapping supply comprising: a supporting element positioned to overlie the seal and the overlapping end portions of the strapping engaged by the seal, said supporting element being engageable with the external surface of the seal; a cutter member mounted to be positioned between the loop of strapping and extending feed end portion thereof, said cutter member having a shearing edge; means for locating the seal lengthwise relative to said supporting element and with an end edge of said seal positioned in cooperable shearing relation with the shearing edge of said cutter member; and means for effecting relative movement between the shearing edge of said cutter member and said supporting element in a direction to bring the shearing edge of said cutter member and said end edge of the seal into cooperative shearing engagement with the extending feed end portion of the strapping, a pivot for said cutter member spaced from said shearing edge thereof and disposed at the end of said cutter member remote from the seal overlying the overlapping end portions of the strapping, and said means for effecting the relative movement between shearing edge of said cutter member and said supporting element being engageable with said cutter member at a point between said shearing edge and said pivot and effecting movement of said cutter member in a direction away from the loop toward the feed end portion thereof.

References Cited in the file of this patent

UNITED STATES PATENTS

| | | |
|---|---|---|
| 2,075,720 | Hoffmann | Mar. 30, 1937 |
| 2,257,090 | Childress | Sept. 30, 1941 |
| 2,336,264 | Leslie | Dec. 7, 1943 |
| 2,607,372 | White | Aug. 19, 1952 |
| 2,707,429 | Leslie et al. | May 3, 1955 |
| 2,707,430 | Leslie et al. | May 3, 1955 |
| 2,777,344 | Smith | Jan. 15, 1957 |
| 2,797,714 | MacChesney | July 2, 1957 |
| 2,801,558 | Crosby et al. | Aug. 6, 1957 |
| 2,864,582 | Hall | Dec. 16, 1958 |
| 2,941,782 | Winkler | June 21, 1960 |